(12) United States Patent
Luo et al.

(10) Patent No.: US 8,670,410 B2
(45) Date of Patent: Mar. 11, 2014

(54) UPLINK CONTROL CHANNEL RESOURCE MAPPING FOR CARRIER AGGREGATION

(75) Inventors: Xiliang Luo, Cardiff, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 13/232,934

(22) Filed: Sep. 14, 2011

(65) Prior Publication Data

US 2012/0236771 A1  Sep. 20, 2012

Related U.S. Application Data

(60) Provisional application No. 61/384,235, filed on Sep. 17, 2010.

(51) Int. Cl.
*H04W 4/00* (2009.01)
(52) U.S. Cl.
USPC .......................................................... 370/331
(58) Field of Classification Search
USPC ................... 370/320, 328–339, 341
See application file for complete search history.

(56) References Cited

U.S. PATENT DOCUMENTS

| 8,121,082 B2* | 2/2012 | Pajukoski et al. ............. 370/329 |
| 8,259,602 B2* | 9/2012 | Kim et al. ...................... 370/252 |
| 2010/0271970 A1 | 10/2010 | Pan et al. | |
| 2010/0272048 A1 | 10/2010 | Pan et al. | |
| 2011/0110246 A1 | 5/2011 | Damnjanovic et al. | |
| 2011/0141878 A1* | 6/2011 | Che et al. ....................... 370/216 |
| 2011/0194443 A1* | 8/2011 | Li et al. .......................... 370/252 |
| 2011/0194500 A1 | 8/2011 | Kim et al. | |
| 2011/0235599 A1* | 9/2011 | Nam et al. ..................... 370/329 |
| 2011/0243066 A1* | 10/2011 | Nayeb Nazar et al. ........ 370/328 |
| 2011/0310819 A1* | 12/2011 | Liao .............................. 370/329 |
| 2012/0039407 A1* | 2/2012 | Tiirola et al. .................. 375/260 |
| 2012/0300741 A1* | 11/2012 | Han et al. ....................... 370/329 |

FOREIGN PATENT DOCUMENTS

WO  WO2010114233 A2  10/2010

OTHER PUBLICATIONS

International Search Report and Written Opinion—PCT/US2011/051841—ISA/EPO—Nov. 15, 2011.
NTT Docomo: "Mapping Table for Rel. 10 Channel Selection for CAW", 3GPP Draft; R1-104926 PUCCH-Channel-Selction, 3rd Generation Partnership Project (3GPP), Mobile Competence Centre; 650, Route Des Lucioles; F-06921 Sophia-Antipolis Cedex; France, vol. RAN WG1, No. Madrid, Spain; 20100823, Aug. 17, 2010, XP050450070, [retrieved on Aug. 17, 2010].
Panasonic, "Support of UL ACK/NACK channel selection for carrier aggregation" 3GPP Draft; R1-101253, 3rd Generation Partnership Project (3GPP), Mobile Competence Centre; 650, Route Des Lucioles; F-06921 Sophia-Antipolis Cedex; France, vol. RAN WG1, No. San Francisco, USA; 20100222, Feb. 16, 2010, XP050418765, [retrieved on Feb. 16, 2010].

* cited by examiner

*Primary Examiner* — Frank Duong
(74) *Attorney, Agent, or Firm* — Seyfarth Shaw LLP

(57) ABSTRACT

In a multi-carrier wireless communication system, component carrier configuration and reconfiguration uses uplink control channel resource mapping with fallback configurations to maintain alignment between a user equipment and a base station during reconfiguration.

51 Claims, 8 Drawing Sheets

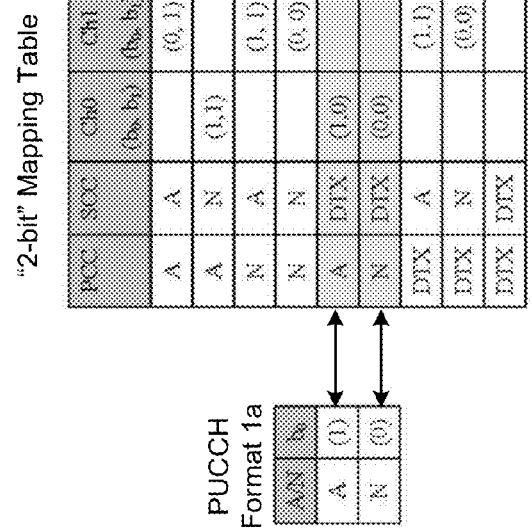
FIG. 3A
FIG. 3B
FIG. 4
FIG. 5

"4-bit" Mapping Table

| PCC | SCC | Ch0 (b₀, b₁) | Ch1 (b₀, b₁) | Ch2 (b₀, b₁) | Ch3 (b₀, b₁) |
|---|---|---|---|---|---|
| A,A | A,A | | | | (1,1) |
| A,N | A,A | | | | (1,0) |
| N,A | A,A | | | | (0,1) |
| N,N | A,A | | | (1,1) | |
| A,A | A,N | | | (0,0) | |
| A,N | A,N | | (1,1) | | |
| N,A | A,N | | (1,0) | | |
| N,N | A,N | | | (1,0) | |
| A,A | N,A | | | | (0,0) |
| A,N | N,A | | (0,1) | | |
| N,A | N,A | | (0,0) | | |
| N,N | N,N | | | (0,1) | |
| A,A | N,N | (1,1) | | | |
| A,N | N,N | (1,0) | | | |
| N,A | N,N | (0,1) | | | |
| N,N | N,N | (0,0) | | | |
| A,A | DTX | (1,1) | | | |
| A,N | DTX | (1,0) | | | |
| N,A | DTX | (0,1) | | | |
| N,N | DTX | (0,0) | | | |
| DTX | A,A | | | (1,1) | |
| DTX | A,N | | | (1,0) | |
| DTX | N,A | | | (0,1) | |
| DTX | N,N | | | | |
| DTX | DTX | | | | |

PUCCH Format 1b

| A,N | (b₀, b₁) |
|---|---|
| A, A | (1,1) |
| A, N | (1,0) |
| N, A | (0,1) |
| N, N | (0,0) |

FIG. 6

UPLINK CONTROL CHANNEL RESOURCE MAPPING FOR CARRIER AGGREGATION

CLAIM OF PRIORITY UNDER 35 U.S.C. §119

The present application for patent claims priority to Provisional Application No. 61/384,235 entitled "Uplink Control Channel Resource Mapping for Carrier Aggregation" filed Sep. 17, 2010, and assigned to the assignee hereof and hereby expressly incorporated by reference herein.

BACKGROUND

1. Field

The present application relates to wireless communication systems in general and, more particularly, to wireless communication systems configured for carrier aggregation.

2. Background

Wireless communication systems are widely deployed to provide various types of communication content such as voice, data, and so on. These systems may be multiple-access systems capable of supporting communication with multiple users by sharing system resources (e.g., bandwidth and transmit power).

In some wireless communication systems, a mobile terminal and a base station communicate on a downlink from the base station to the mobile terminal and an uplink from the mobile terminal to the base station. The mobile station may be configured to acknowledge downlink data transmissions by sending control information to the base station on the uplink.

SUMMARY

Techniques for acknowledging downlink data transmissions in a multi-carrier wireless communication system are disclosed. In one aspect, a user equipment (UE) configured for multi-carrier operation determines a first number of ACK/NACK bits for acknowledging downlink data transmissions on a first configuration of a plurality of component carriers (CCs) configured for the UE. The UE selects a first mapping of ACK/NACK bits to uplink control channel resources based on the first number of ACK/NACK bits, where the first mapping includes a fallback configuration for downlink data transmissions on a single component carrier. The fallback configuration matches a single component carrier configuration for downlink data transmissions in a second mapping of ACK/NACK bits to uplink control channel resources. The UE determines uplink control channel resources for acknowledging the downlink data transmissions on the first configuration of CCs based on the first mapping and sends ACK/NACK information, for the downlink data transmissions, on uplink control channel resources based on the first mapping.

In one aspect, the UE receives a higher-layer command to change from the first configuration of component carriers to a second configuration of component carriers, and receives downlink data transmissions on a single component carrier for a period after the receipt of the higher-layer command. The UE may determine uplink control channel resources for acknowledging downlink data transmissions on the single component carrier based on the fallback configuration of the first mapping. Alternatively, the UE may select a third mapping of uplink control channel resources corresponding to the second configuration of component carriers. The third mapping may also include the fallback configuration for single carrier downlink transmissions and the UE may determine uplink control channel resources for acknowledging downlink data transmissions based on the fallback configuration of the first mapping or the fallback configuration of the third mapping. The UE may determine a second number of ACK/NACK bits for acknowledging downlink data transmissions on the second configuration of component carriers (CCs) and may select the third mapping of ACK/NACK bits to uplink control channel resources based on the second number of ACK/NACK bits.

The UE may receive a higher layer command to change an activation status of at least one carrier in the first configuration of component carriers. The UE may receive downlink data transmissions on a single component carrier for a period after the receipt of the higher layer command. In one aspect, the UE determines uplink control channel resources for acknowledging downlink data transmissions based on the fallback configuration of the first mapping, after receipt of the higher-layer command, and sends ACK/NACK information, for the downlink data transmissions on the single component carrier on uplink control channel resources based on the fallback configuration of the first mapping. Alternatively, the UE may select a third mapping of uplink control channel resources corresponding to the change in activation status. The third mapping may include the fallback configuration for single carrier downlink transmissions and the UE may determine uplink control channel resources for acknowledging downlink data transmissions based on the fallback configuration of the first mapping or the fallback configuration of the third mapping.

The UE may determine a second number of ACK/NACK bits for acknowledging downlink data transmissions on a plurality of activated component carriers and may select the third mapping based on the second number of ACK/NACK bits. The UE may then determine uplink control channel resources for acknowledging the downlink data transmissions on the plurality of activated component carriers based on the third mapping and send ACK/NACK information for the downlink data transmissions on the uplink control channel resources.

In other aspects, the UE may receive a higher-layer command to change a transmission mode of at least one carrier in the first configuration of component carriers and receive downlink data transmissions on a single component carrier for a period after the receipt of the higher-layer command. The UE may determine uplink control channel resources for acknowledging downlink data transmissions on the single carrier based on the fallback configuration of the first mapping after receipt of the higher-layer command. Alternatively, the UE may select a third mapping of uplink control channel resources corresponding to the change in the transmission mode. The third mapping may include the fallback configuration for single carrier downlink transmissions and the UE may determine uplink control channel resources for acknowledging downlink data transmissions based on the fallback configuration of the first mapping or the fallback configuration of the third mapping.

The UE may determine a second number of ACK/NACK bits for acknowledging downlink data transmissions on a plurality of the configured component carriers in connection with the higher-layer command, including the at least one carrier in a second transmission mode, and select the third mapping of ACK/NACK bits to uplink control channel resources based on the second number of ACK/NACK bits. The UE may send ACK/NACK information for the downlink data transmissions on the uplink control channel resources based on the third mapping.

Other aspects include apparatus and articles of manufacture for performing the disclosed method.

In one aspect, a base station configured for multi-carrier operation receives ACK/NACK information from a user equipment (UE) on uplink control channel resources, acknowledging downlink data transmissions. The base station may determine ACK/NACK bits from the ACK/NACK information based on a first mapping of uplink control channel resources corresponding to a configuration of the UE, where the first mapping includes a fallback configuration for downlink data transmissions on a single component carrier, and where the fallback configuration matches a configuration for downlink data transmissions on the single component carrier in a second mapping of uplink control channel resources to ACK/NACK bits. The base station transmits a higher-layer command for a second configuration of downlink component carriers, and schedules downlink data transmission to the UE on a single component carrier for a transition period following transmission of the higher-layer command. In one aspect, the higher-layer command may be one of a reconfiguration command, an activation command, a deactivation command or a command to change transmission mode.

Additionally, the base station may receive ACK/NACK bits on uplink control channel resources corresponding to the fallback configuration of the first mapping, or corresponding to a matching fallback portion of a third mapping determined according to the reconfiguration. The base station may transmit downlink data on the second configuration of component carriers and receive ACK/NACK bits on uplink control channel resources corresponding to the third mapping after the period.

Other aspects include apparatus and articles of manufacture for performing the method.

BRIEF DESCRIPTION OF THE DRAWINGS

Aspects of the present disclosure are illustrated in the accompanying drawings in which:

FIG. 3A is a table illustrating an exemplary mapping of one ACK/NACK bit to an uplink control channel resource for a single carrier configured with one codeword;

FIG. 3B is a table illustrating an exemplary mapping of two ACK/NACK bits to an uplink control channel resource for a single carrier configured with two codewords;

FIG. 4 is a table illustrating an exemplary mapping of ACK/NACK bits to uplink control channel resources in an exemplary two-carrier system;

FIG. 5 is a table illustrating another exemplary mapping of ACK/NACK bits to uplink control channel resources in an exemplary two-carrier system;

FIG. 6 is a table illustrating another exemplary mapping of ACK/NACK bits to uplink control channel resources in an exemplary two-carrier system;

DETAILED DESCRIPTION

Figure 1:
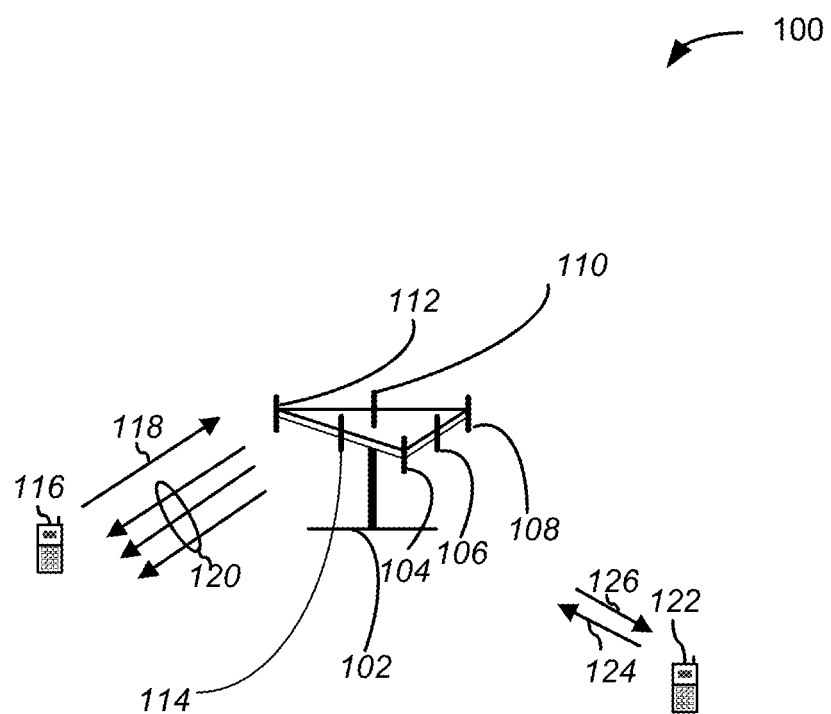
FIG. 1 illustrates an exemplary multi-carrier wireless communication system.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, Node B, evolved NodeB (eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various features and aspects of the present disclosure will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The techniques described herein may be practiced in a multi-carrier wireless communication system. One exemplary wireless communication system may utilize an orthogonal frequency division multiplex (OFDM) that partitions the overall system bandwidth into multiple ($N_F$) subcarriers, which may also be referred to as frequency sub-channels, tones or frequency bins. Data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on forward and reverse links. The forward link (or downlink, DL) can refer to a communication link from the base stations to the wireless terminals. The reverse link (or uplink, UL) can refer to the communication link from the terminals to the base stations. In a multi-carrier system, one or more component carriers (CCs) can be configured on the DL and the UL for each wireless terminal. Such configurations can be symmetric (in which a wireless terminal has a same number of downlink and uplink component carriers), or asymmetric (in which the wireless has a different number of downlink and uplink carriers). The transmission mode of each CCs, in turn, can be configured separately.

MIMO transmissions employ multiple ($N_T$) transmit antennas and multiple ($N_R$) receive antennas. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO transmission can provide improved performance (e.g., higher throughput and/or greater reliability) if the additional dimensionalities created by the multiple transmit and receive antennas are utilized. MIMO is also supported in both time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 shows a multi-carrier wireless communication system 100. A base station 102 may include multiple antenna groups, and each antenna group may comprise one or more antennas. For example, if the base station 102 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

A first user equipment 116 communicates with, for example, the fifth antenna 112 and the sixth antenna 114 to enable the transmission of information to the first user equipment 116 over a first forward link 120. As shown, the exemplary first forward link 120 comprises three component carriers (CCs) while the exemplary first reverse link 118 includes one component carrier. The number of component carriers in both the forward link 120 and the reverse link 118 may vary over time and is not limited by the present example. For instance, from time to time, base station 102 may configure and reconfigure a plurality of uplink and downlink CCs for the user equipment 116, 122 it serves. The base station 102 may also activate and deactivate configured component carriers and/or change transmission modes to vary downlink transmissions to user equipment 116, 122.

FIG. 1 also illustrates a second user equipment 122 in communication with, for example, the third antenna 108 and the fourth antenna 110 of base station 102 to enable the transmission of information to the second user equipment 122 over a second forward link 126, and the reception of information from the second user equipment 122 over a second reverse link 124. In a Frequency Division Duplex (FDD) system, the component carriers 118, 120, 124 126 shown in FIG. 1 may use different frequencies for communication. For example, the first forward link 120 may use a different frequency than that used by the first reverse link 118.

Each group of antennas and/or the area in which they are designed to communicate may be referred to as a sector of base station 102. For example, the antenna groups depicted in FIG. 1 may be designed to communicate with the user equipment 116, 122 in a different sectors of the base station 102. On the forward links 120 and 126, the transmitting antennas of the base station 102 may utilize beamforming in order to improve the signal-to-noise ratio of the forward links for the different user equipment 116 and 122. Use of beamforming to transmit to user equipment scattered throughout a coverage area may reduce the amount of interference caused to user equipment in neighboring cells.

The exemplary multi-carrier communication system 100 may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

In addition, the various logical transport channels in the communication system may be classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

The downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Figure 2:
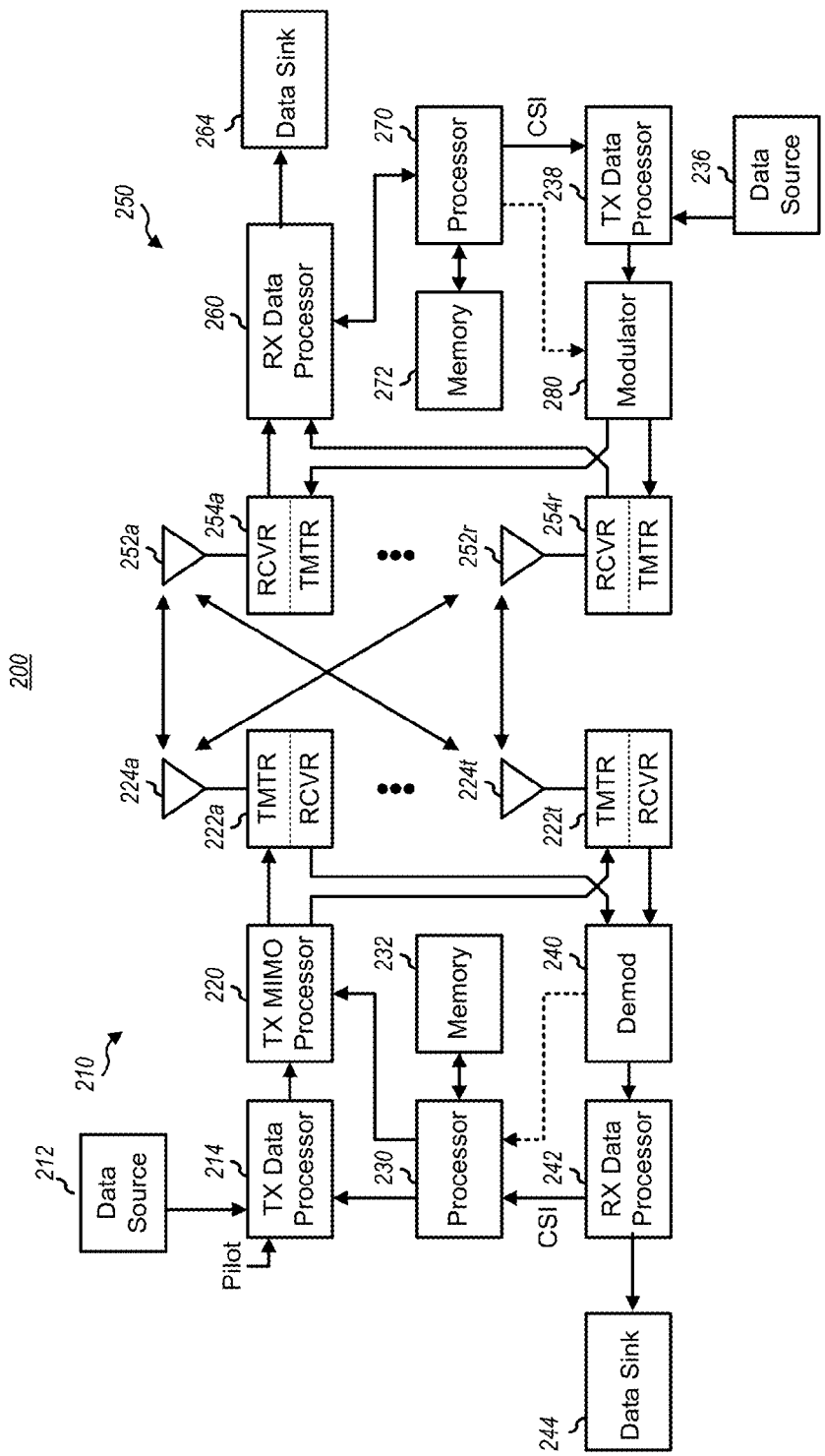
FIG. 2 is a block diagram of a base station and user equipment in an exemplary multi-carrier wireless communication system such as illustrated in FIG. 1.

Further, the following terminology and features may be used in describing the various disclosed embodiments:
3GPP 3rd Generation Partnership Project
AMC Adaptive modulation and coding
BTS Base transceiver station
CC Component carrier
CSI Channel state information
CQI Channel quality indicator
DCI Downlink control information
DFT-S-OFDM Discrete Fourier transform spread OFDM
DL Downlink (base station to subscriber transmission)
E-UTRAN Evolved UMTS terrestrial radio access network
eNB Evolved Node B
FDD Frequency division duplex
LTE Long term evolution
MIMO Multiple-input-multiple-output
OFDMA Orthogonal frequency division multiple access
PDCCH Physical downlink control channel
PDSCH Physical downlink shared channel
PMI Precoding matrix indicator
PCC Primary component carrier
PUCCH Physical uplink control channel
PUSCH Physical uplink shared channel
RI Rank Indicator
SCC Secondary component carrier
SIMO Single-input-multiple-output
UL Uplink FIG. 2 is a block diagram illustrating additional aspects of an exemplary multi-carrier wireless communication system 200 which can be as described in FIG. 1. As shown, system 200 comprises a base station 210 (also referred to as a "transmitter system," "access point," or "eNodeB") and a user equipment 250 (also referred to as a "receiver system," "remote terminal" or "access terminal"). It will be appreciated that even though the base station 210 is referred to as a transmitter system and the user equipment 250 is referred to as a receiver system, as illustrated, these systems communicate bi-directionally. As such, the terms "transmitter system" and "receiver system" are not limited to single direction communications from either system. Further, it should also be noted the transmitter system 210 and the receiver system 250 of FIG. 2 may each communicate with a plurality of other receiver and transmitter systems.

At the base station 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data. The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the present example, modulation symbols for all data streams may be provided to a TX MIMO processor 220, which can perform further processing (e.g., for OFDM). The TX MIMO processor 220 may then provide $N_T$ modulation symbol streams to $N_T$ transmitter system transceivers (TMTR) 222a through 222t. The TX MIMO processor 220 may further apply beamforming weights to the symbols of the data streams and to the antenna 224 from which the symbol is transmitted.

Transceiver 222a through 222t at base station 210 receive and process a respective symbol stream to provide one or more analog signals, and further condition the analog signals to provide a modulated signal suitable for transmission. In some systems, the conditioning may include, but is not limited to, operations such as amplification, filtering, up-conversion and the like. The modulated signals produced by the transceivers 222a through 222t are then transmitted from the antennas 224a through 224t of transmitter system 210 as shown in FIG. 2.

At the user equipment 250, the transmitted modulated signals may be received by the antennas 252a through 252r, and the received signal from each of the receiver system antennas 252a through 252r is provided to a respective transceiver (RCVR) 254a through 254r. Each transceiver 254a through 254r at the user equipment 250 may condition a respective received signal, digitize the conditioned signal to provide samples and further processes the samples to provide a corresponding "received" symbol stream. Conditioning may include, but is not limited to, operations such as amplification, filtering, down-conversion and the like.

An RX data processor 260 receives and processes symbol streams from transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 can demodulate, de-interleave and decode each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

A channel response estimate may be generated by the RX data processor 260 and used to perform space/time processing at the receiver system, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system can further derive channel state information (CSI) which may include information regarding the communication link and/or the received data stream.

The receiver system 250 may be capable of receiving and processing spatially multiplexed signals. Spatial multiplexing may be performed at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system that receives and processes spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Communication system 200 can also utilize transmit diversity schemes instead of the spatially multiplexed scheme described above. In these examples, the same data stream is transmitted across the transmitter system antennas 224a through 224t. The data rate delivered to the receiver system 250 is typically lower than spatially multiplexed MIMO communication systems 200. Transmit diversity schemes can provide robustness and reliability of the communication channel. Each of the signals transmitted from the transmitter system antennas 224a through 224t will experience a different interference environment (e.g., fading, reflection, multi-path phase shifts). The different signal characteristics received at the receiver system antennas 252a through 254r may be useful in determining the appropriate data stream.

Other examples may utilize a combination of spatial multiplexing and transmit diversity. For example, in a system with four antennas 224, a first data stream may be transmitted on two of the antennas, and a second data stream may be transmitted on the remaining two antennas. In these exemplary systems, the rank indicator may be set to an integer lower than the full rank of the precode matrix, indicating to the transmitter system 210 to employ a combination of spatial multiplexing and transmit diversity. As described herein, transmitter system 210 may vary the number of codewords in a downlink data transmission to receiver system 250. For example, transmitter system 210 may send a higher-layer command to receiver system 250 to reconfigure its component carriers, to activate or deactivate a component carrier, and/or change to the transmission mode of a component carrier.

At the transmitter system 210, the modulated signals from the receiver system 250 are received by the transmitter system antennas 224, conditioned by the transceivers 222, demodulated by a demodulator 240, and processed by the RX data processor 242 to extract the reserve link message transmitted by the receiver system 250. Processor 230 at the transmitter system 210 may then determine which pre-coding matrix to use for future forward link transmissions. Processor 230 can also use the received signal to adjust the beamforming weights for future forward link transmissions.

In a conventional single-carrier system, such as 3GPP LTE Rel-8, a downlink carrier transmitted by the base station may be configured with one or two codewords corresponding to one or two respective data blocks in a downlink transmission subframe. Upon receipt of the downlink transmission, the user equipment attempts to decode the data transmissions using techniques that are well-known in the art.

For a one-codeword carrier configuration, the user equipment will transmit a response including one bit of ACK/NACK (acknowledgement/negative acknowledgement) information using designated resources in the uplink control channel. For single codeword carrier configurations, LTE REL-8 uses a physical uplink control channel (PUCCH) format designated as PUCCH Format 1a. FIG. 3A is a table illustrating the mapping of an ACK (A) and a NACK (N) to a single bit ($b_0$) according to PUCCH Format 1a, in which a '1' signifies an ACK and a '0' signifies NACK. The single bit of ACK/NACK information is then mapped to a BPSK symbol, where an ACK is modulated to −1 and a NACK is modulated to +1.

For a two codeword carrier configuration, the user equipment may transmit a response including 2-bits of ACK/NACK information using designated resources in the uplink control channel. For 2-codeword carrier configurations, LTE Rel-8 uses a PUCCH format designated as PUCCH format 1b. Format 1b allocates two bits to ACK/NACK signaling to support 4 different ACK/NACK states, as illustrated in FIG. 3B. FIG. 3B is a table illustrating the mapping of four possible ACK/NACK states to two bits ($b_0$, $b_1$) according to PUCCH Format 1b. The 2 bits are then modulated to a QPSK symbol, where (0,0) maps to (+1), (0,1) maps to (−j), (1,0) maps to (+j), and (1,1) maps to (−1).

Generally speaking, in a multi-carrier wireless communication system configured for N aggregated component carriers, and where each component carrier can be configured with one or two codewords, the number of configured codewords M for a given configuration can range from N to 2N, and a corresponding number of possible ACK/NACK states from $2^N$ to $2^{2N}$. The number of ACK/NACK information bits for reporting ACK/NACK states for M codewords can be M bits (corresponding to $2^M$ possible ACK/NACK states). If the system is also configured to support discontinuous transmission (DTX), then additional bits may be needed to report a larger total number of unique ACK/NACK/DTX states.

Uplink control channel information, such as ACK/NACK reporting, may be limited to a designated carrier, such as the primary component carrier (PCC) in LTE Rel-10. If the uplink control channel format used to report ACK/NACK information (such as PUCCH format 1b) is limited, then other techniques may be utilized.

One such approach is to use uplink control channel reporting with channel selection. With this approach, the uplink resources selected for providing ACK/NACK feedback may convey additional bits of information. For example, when the UE is configured to use PUCCH Format 1b with channel selection, two bits may be signaled explicitly and another two bits may be conveyed through the choice of uplink control resources from a set of available uplink control channel resources. This approach works when the user equipment and the base station are using the same mapping of ACK/NACK bits to uplink control channel resources.

However, problems can arise when the system tries to reconfigure the UE for a different number of component carriers, a different number of codewords, and/or activates or deactivates one or more configured carriers. This type of configuration change is managed by commands from higher layers, such as radio resource control (RRC) signaling in LTE. Timing, in particular, can be a problem. While a single transmission subframe may span 1 millisecond, the reconfiguration process may require much longer to complete (e.g., 100+ milliseconds), and this transition period may vary depending on the capabilities of the user equipment. Therefore, even if the UE correctly decodes the reconfiguration command, the base station may have no indication of when the UE is reconfigured and ready to receive data under the new configuration. As a result, the UE and the base station may become misaligned.

FIG. 4 illustrates, in part, a resource mapping table, identified as a "2-bit mapping table," for a two DL component carrier configuration where each carrier is configured with one codeword. For convenience, one carrier is designated as the primary component carrier (PCC) and the other carrier is designated as the secondary component carrier (SCC), but the disclosure is not so limited. This mapping table maps two bits ($b_0$, $b_1$) to two different uplink control channel resource elements, shown here as Ch0 and Ch1, in order to represent eight different ACK/NACK/DTX states. Note that a ninth state, DTX/DTX, is a "don't care" representing the condition where the base station has not transmitted downlink data and is not expecting an acknowledgement.

As illustrated in FIG. 4, and discussed in greater detail below, the exemplary mapping has two entries corresponding to PUCCH format 1a for a single carrier configured with one codeword, which are designated as a fallback configuration or single carrier configuration. It will be appreciated that this mapping is for purposes of illustration only and that other mappings may be used to represent the various ACK/NACK/DTX states.

FIG. 5 illustrates, in part, a resource mapping table, identified as a "3-bit mapping table," for a two DL component carrier configuration where one carrier is configured with two codewords, and the other carrier is configured with one codeword. For convenience, one carrier is designated as the primary component carrier (PCC) and the other carrier is designated as the secondary component carrier (SCC), but the disclosure is not so limited. This mapping table maps two bits ($b_0$, $b_1$) to three different uplink control channel resource elements, shown here as Ch0, Ch1, and Ch2, in order to represent 14 different ACK/NACK/DTX states. An exemplary $15^{th}$ state, DTX/DTX, is a "don't care" representing the condition where the base station has not transmitted downlink data and is not expecting an acknowledgement. Also, as shown in the exemplary mapping of FIG. 5, NACK and DTX entries may be treated the same for a particular component carrier to accommodate additional states. For instance, in the exemplary 3-bit table, the same uplink resources (Ch0) and bit values (b0, b1) may be utilized to signal (N, N) for PCC and (A) for SCC as are used to signal (DTX, DTX) for PCC and (A) for SCC.

As illustrated in FIG. 5, and discussed in greater detail below, this table has four entries corresponding to PUCCH format 1b for a single carrier configured with two codewords and the other carrier in DTX mode, designated as a fallback configuration or single carrier configuration. It will be appreciated that this mapping is exemplary and that other mappings may be used to represent the various ACK/NACK/DTX states.

FIG. 6 illustrates, in part, a resource mapping table, identified as a "4-bit mapping table," for a 2 DL component carrier configuration where both carriers are configured with two codewords. For convenience, one carrier is designated as the primary component carrier (PCC) and the other carrier is designated as the secondary component carrier (SCC), but the disclosure is not so limited. This mapping table maps two bits ($b_0$, $b_1$) to four different uplink control channel resource elements, designated as Ch0, Ch1, Ch2 and Ch3 in order to represent 23 different ACK/NACK/DTX states. This mapping has a $24^{th}$ state, DTX/DTX that is a "don't care" state. As previously indicated, N/N and DTX entries may be treated the same for a particular component carrier to accommodate additional states. For instance, the same uplink resources (Ch2) and bit values (b0, b1) may be utilized to signal (N, N) for PCC and (A, A) for SCC as are used to signal (DTX, DTX) for PCC and (A, A) for SCC in the 4-bit table.

As illustrated in FIG. 6, and discussed in greater detail below, this table has four entries corresponding to PUCCH format 1b for a single carrier configured with two codewords and the other carrier in DTX mode, designated as a fallback configuration or single carrier configuration. It will be appreciated that this mapping is exemplary and that other mappings may be used to represent the various ACK/NACK/DTX states.

It will be appreciated that the mapping tables illustrated in FIGS. 4-6 are exemplary mappings for configurations of two component carriers, and that the present disclosure is not so limited. Configurations of three, four or more component carriers may be supported using the same general principles described herein.

According to the present disclosure, each multi-carrier resource mapping includes a fallback configuration that enables seamless ACK/NACK feedback during a transition period in which the UE processes higher-layer commands. The fallback configuration, for example, may facilitate the use of single-carrier transmissions by the base station while the UE higher-layer protocol stack is finalized and other steps in the reconfiguration are completed.

In one example of this operation, a UE may be configured with two component carriers (PCC and SCC), both in MIMO transmission modes. The UE may be as described in connection with FIG. 1 and FIG. 2 and may utilize the exemplary mapping of FIG. 6 in two CC configuration to determine uplink resources for signaling ACK/NACK information for a downlink transmission of four codewords.

Continuing with the example, the base station may reconfigure the UE and thereby change the number of component carriers on which downlink transmissions are received and/or their corresponding transmission modes. For instance, if the base station changes SCC from a MIMO transmission mode to a SIMO transmission mode then, under the new configuration, the UE may need to send ACK/NACK for only three codewords. As a result, the UE may transition to the exemplary mapping shown in FIG. 5. At the physical (PHY) layer, the UE may ACK the higher-layer command to change transmission modes in a relatively short period of time. However, as indicated, the UE may provide no signaling as to when its higher-layer protocol stack is finalized and the new transmission mode is fully effective.

During the transition period, while the higher-layer command is processed, the base station may limit its downlink transmissions to a single-carrier. However, since the base station may not know the extent to which the UE has finished processing the higher-layer command, it also may not know which mapping of uplink resources the UE is utilizing to acknowledge the single-carrier transmissions (e.g., the UE may have acknowledged and fully processed the command, or it may still be processing the command, when the single-carrier transmission is received). In one aspect, the UE utilizes the fallback portion of its multi-carrier resource mapping during the transition period. Since the 4-bit mapping of FIG. 6 and the 3-bit mapping of FIG. 5 each include a fallback configuration with subset of entries which match the format 1B configuration of FIG. 3, both mappings yield the same uplink resources for the single-carrier transmission and thus the possibility of misalignment is avoided. The same fallback design may apply to mappings for additional component carriers and may also be utilized during transitions that occur when the number of component carriers change due to activation, deactivation or reconfiguration.

Figure 7:
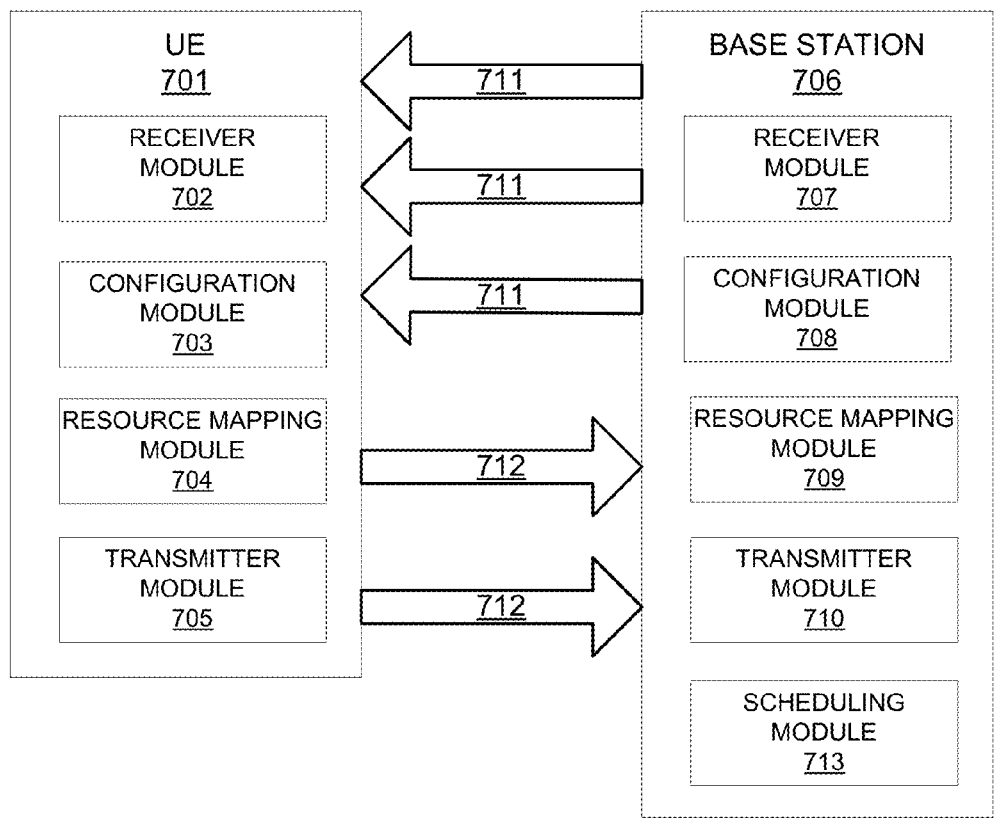
FIG. 7 is a functional block diagram illustrating further aspects of a user equipment and a base station according to the present disclosure.

FIG. 7 is a functional block diagram illustrating aspects of a user equipment (UE) and base station according to the present disclosure. In FIG. 7, a multi-carrier UE 701 includes a configuration module 703 configured to determine a first number of ACK/NACK bits for acknowledging downlink data transmissions on a first configuration of a plurality of downlink component carriers (CCs) 711 configured for the multi-carrier UE 701. UE 701 also includes a resource mapping module 704 for selecting a first mapping of ACK/NACK bits to uplink control channel resources based on the first number of ACK/NACK bits, where the first mapping includes a fallback configuration for downlink data transmissions on a single component carrier of the plurality of component carriers 711, and where the fallback configuration matches a single component carrier configuration for downlink data transmissions in a second mapping of ACK/NACK bits to uplink control channel resources.

Resource mapping module 704 is also configured to determine the uplink control channel resources on one of uplink component carriers 712 for acknowledging the downlink data transmissions on the first configuration of CCs 711 based on the first mapping. Transmitter module 705 is configured to send ACK/NACK information (for the downlink data transmissions on downlink component carriers 711) on uplink control channel resources in one of uplink carriers 712, based on the first mapping. Receiver module 702 is configured to receive a higher-layer command (where the higher-layer command may be, for example, one of a reconfiguration command, an activation command, a deactivation command or a command to change transmission mode, such as SIMO to MIMO or MIMO to SIMO) to change from the first configuration of component carriers 711 to a second configuration of component carriers 711, and to receive downlink data transmissions on only a single component carrier for a predetermined period after the receipt of the higher-layer command. Resource mapping module 704 determines the uplink control channel resources for acknowledging downlink data transmissions based on the fallback configuration of the first mapping, or upon a fallback configuration of a third mapping corresponding to the new configuration. Transmitter module 705 sends the ACK/NACK information, for the downlink data transmissions on the single component carrier 711, on uplink control channel resources in one of uplink component carriers 712, based on the fallback configuration of the first mapping or the third mapping.

Configuration module 703 determines a second number of ACK/NACK bits for acknowledging downlink data transmissions on the second configuration of CCs 711, and resource mapping module 704 selects the second mapping of ACK/NACK bits to uplink control channel resources on one of uplink component carriers 712, based on the second number of ACK/NACK bits. Transmitter module 705 sends ACK/NACK information, for the downlink data transmissions on the single downlink component carrier, on uplink control channel resources based on the fallback configuration. Resource mapping module 704 determines the uplink control channel resources for acknowledging the downlink data transmissions on the second configuration of component carriers based on the third mapping, and transmitter module 705 sends ACK/NACK information for the downlink data transmissions on the uplink control channel resources based on the third mapping.

Also illustrated in FIG. 7, a base station 706 includes a receiver module 707 for receiving ACK/NACK information from the UE 701, on uplink control channel resources in one of uplink component carriers 712, acknowledging downlink data transmissions on one or more downlink component carriers 711. Configuration module 708 and resource mapping module 709 determine ACK/NACK bits from the ACK/NACK information based on the first mapping of uplink control channel resources corresponding to the configuration of the UE 701, where the first mapping includes a fallback configuration for downlink data transmissions on a single downlink component carrier 711, and where the fallback configuration matches the configuration for downlink data transmissions on the single component carrier 711 in a second mapping of uplink control channel resources to ACK/NACK bits.

Transmitter module 710 transmits a higher-layer command (where the higher-layer command may be, for example, one of a reconfiguration command, an activation command, a deactivation command or a command to change transmission mode, such as SIMO to MIMO or MIMO to SIMO) for a second configuration of downlink component carriers, and scheduling module schedules downlink data transmission to the UE 701 on only a single component carrier 711 for a predetermined period after transmission of the higher-layer command.

Receiver module 707 receives ACK/NACK bits on uplink control channel resources on one of uplink component carriers 711, during the predetermined period for transitioning to the second configuration. Resource mapping module 709 determines ACK/NACK information based on the uplink control channel resources. After the predetermined period, transmitter module 710 transmits downlink data on the second configuration of component carriers 711. Receiver module 707 receives ACK/NACK bits on uplink control channel resources.

It will be recognized that processor 230 at the base station 210 and the processor 270 at the user equipment 250 direct the operations performed at their respective devices. In particular, the processors 230, 270 are capable of executing instructions to carry out a sequence of steps for performing different algorithms and processes related to configuration management and ACK/NACK reporting as described above. Additionally, a memory 232 at the transmitter system 210 and a memory 272 at the receiver system 250 can provide storage for the instructions and data used by the transmitter system processor 230 and the receiver system processor 270, respectively.

Figure 8:
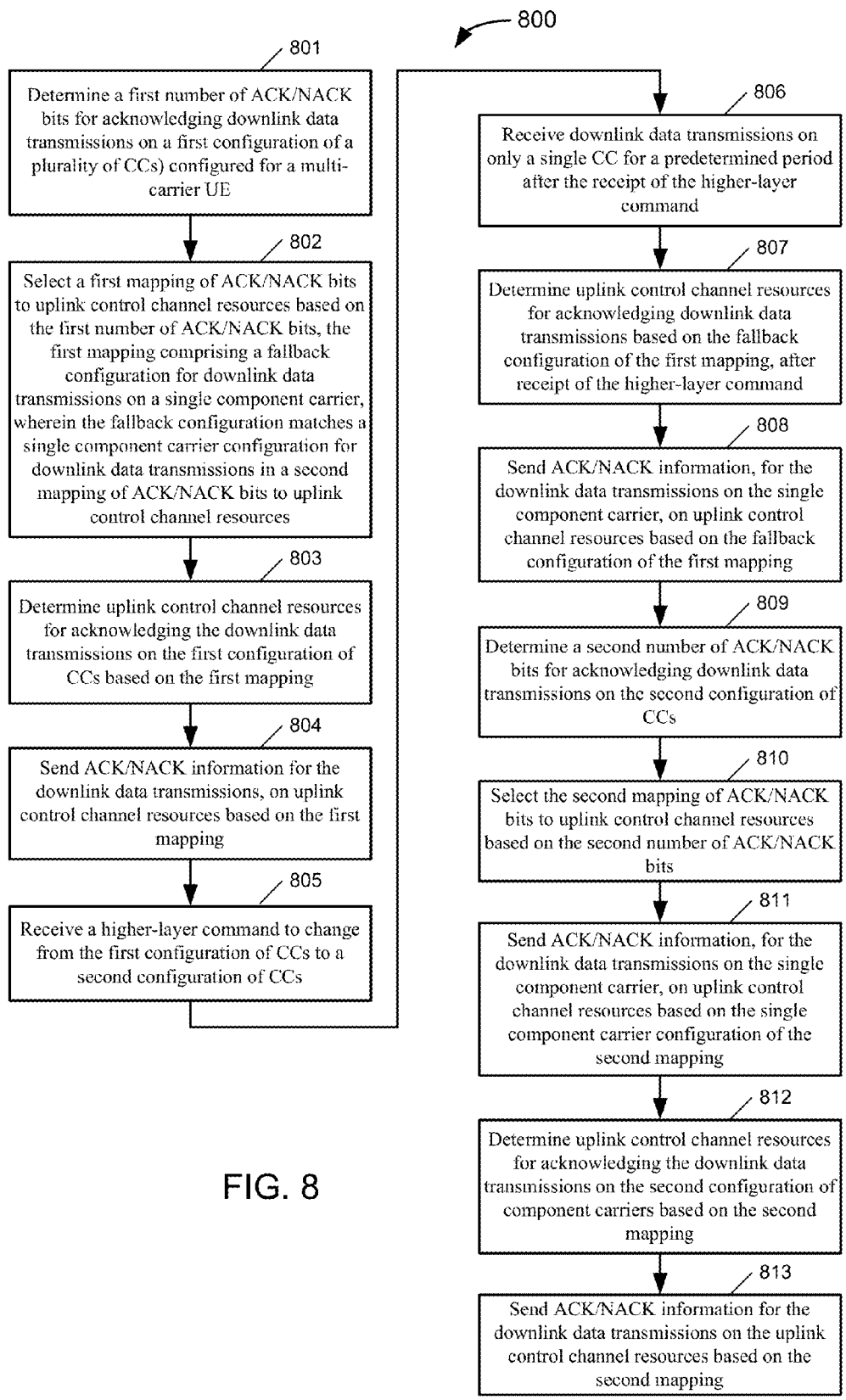
FIG. 8 is a flowchart illustrating an exemplary method in a user equipment for reporting ACK/NACK information in according to the present disclosure.

FIG. 8 is a flowchart 800 illustrating a method in a user equipment, such as user equipment 116, 250 or 701 in FIGS.

1, 2 and 7 respectively. At operation 801, the UE determines a first number of ACK/NACK bits for acknowledging downlink data transmissions on a first configuration of a plurality of component carriers (CCs) configured for a multi-carrier user equipment (UE), At operation 802, the UE selects a first mapping of ACK/NACK bits to uplink control channel resources based on the first number of ACK/NACK bits, where the first mapping comprising a fallback configuration for downlink data transmissions on a single component carrier, and where the fallback configuration matches a single component carrier configuration for downlink data transmissions in a second mapping of ACK/NACK bits to uplink control channel resources. At operation 803, the UE determines uplink control channel resources for acknowledging the downlink data transmissions on the first configuration of CCs based on the first mapping. At operation 804, the UE sends ACK/NACK information for the downlink data transmissions, on uplink control channel resources based on the first mapping.

At operation 805, the UE receives a higher-layer command to change from the first configuration of component carriers to a second configuration of component carriers. At operation 806, the UE receives downlink data transmissions on only a single component carrier for a period of transition after the receipt of the higher-layer command. At operation 807, the UE determines uplink control channel resources for acknowledging downlink data transmissions based on the fallback configuration of the first mapping, after receipt of the higher-layer command. At operation 808, the UE sends ACK/NACK information, for the downlink data transmissions on the single component carrier, on uplink control channel resources based on the fallback configuration of the first mapping.

At operation 809, the UE determines a second number of ACK/NACK bits for acknowledging downlink data transmissions on the second configuration of component carriers. At operation 810, the UE selects the second mapping of ACK/NACK bits to uplink control channel resources based on the second number of ACK/NACK bits, At operation 811, the UE sends ACK/NACK information, for the downlink data transmissions on the single component carrier, on uplink control channel resources based on the single component carrier configuration of the second mapping. At operation 812, the UE determines uplink control channel resources for acknowledging the downlink data transmissions on the second configuration of component carriers based on the second mapping. And, at operation 813, the UE sends ACK/NACK information for the downlink data transmissions on the uplink control channel resources based on the second mapping.

Figure 9:
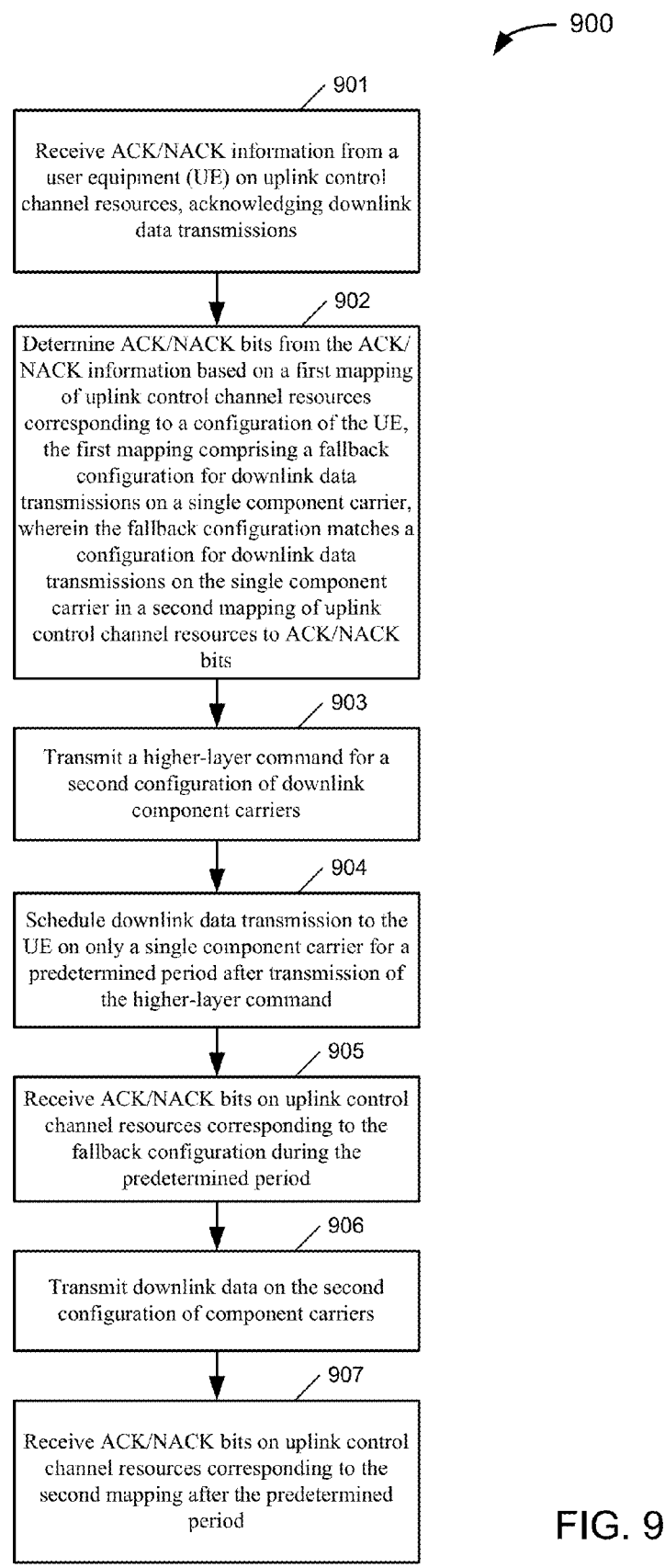
FIG. 9 is a flowchart illustrating an exemplary method in a base station for receiving ACK/NACK information according to the present disclosure.

FIG. 9 is a flowchart 900 illustrating a method 900 according to the present disclosure, in a base station such as base station 102, 210 or 706 in FIGS. 1, 2 and 7, respectively. At operation 901, the base station receives ACK/NACK information from a user equipment (such as user equipment 116, 250 or 701) on uplink control channel resources, acknowledging downlink data transmissions At operation 902, the base station determines ACK/NACK bits from the ACK/NACK information based on a first mapping of uplink control channel resources corresponding to a configuration of the UE, where the first mapping includes a fallback configuration for downlink data transmissions on a single component carrier, and where the fallback configuration matches a configuration for downlink data transmissions on the single component carrier in a second mapping of uplink control channel resources to ACK/NACK bits.

At operation 903, the base station transmits a higher-layer command for a second configuration of downlink component carriers. At operation 904, the base station schedules downlink data transmissions to the UE on only a single component carrier for a predetermined period after transmission of the higher-layer command. At operation 905. the base station receives ACK/NACK bits on uplink control channel resources corresponding to the fallback configuration during the predetermined period. At operation 907, the base station, transmits downlink data on the second configuration of component carriers. And, at operation 907, the base station receives ACK/NACK bits on uplink control channel resources corresponding to the second mapping after the predetermined period.

Figure 10:
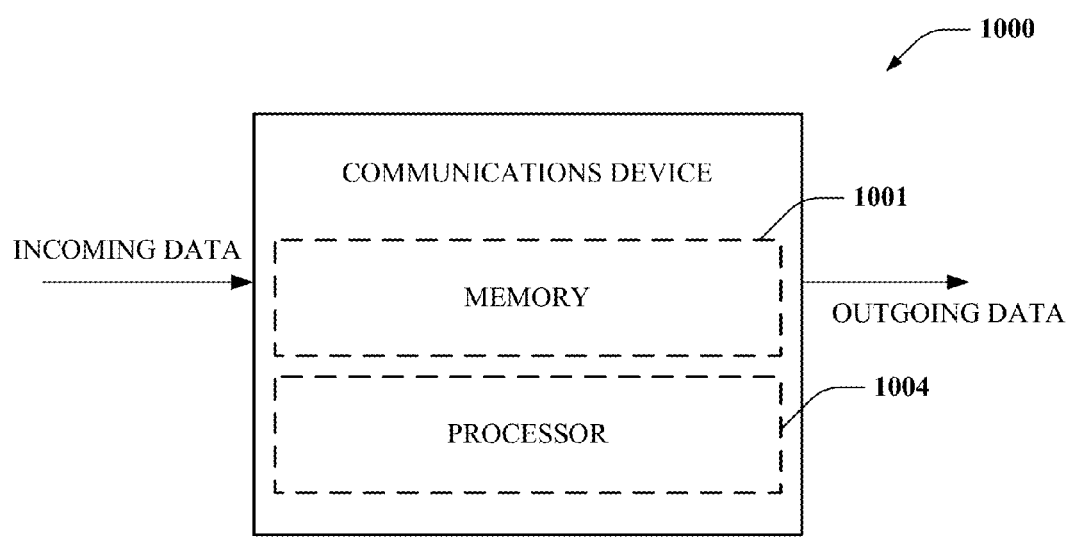
FIG. 10 illustrates an exemplary apparatus capable of performing the exemplary methods illustrated in FIG. 8 and FIG. 9.

FIG. 10 illustrates an apparatus 1000 within which the various disclosed embodiments may be implemented. In particular, the apparatus 1000 may comprise at least a portion of an eNodeB such as eNodeB 305 illustrated in FIG. 3 and/or at least a portion of a user equipment such as UE 301 illustrated in FIG. 3 and/or at least a portion of a transmitter system or a receiver system such as the transmitter system 210 and the receiver system 250 that are depicted in FIG. 2. The apparatus 1000 can be resident within a wireless network and receive incoming data via, for example, one or more receivers and/or the appropriate reception and decoding circuitry (e.g., antennas, transceivers, demodulators and the like). The apparatus 1000 can also transmit outgoing data via, for example, one or more transmitters and/or the appropriate encoding and transmission circuitry (e.g., antennas, transceivers, modulators and the like). Additionally, or alternatively, the apparatus 1000 may be resident within a wired network.

FIG. 10 further illustrates that the apparatus 1000 can include a memory 1002 that can retain instructions for performing one or more operations, such as signal conditioning, analysis and the like. Additionally, the apparatus 1000 of FIG. 10 may include a processor 1004 that can execute instructions that are stored in the memory 1002 and/or instructions that are received from another device. The instructions can relate to, for example, configuring or operating the apparatus 1000 or a related communications apparatus. It should be noted that while the memory 1002 that is depicted in FIG. 10 is shown as a single block, it may comprise two or more separate memories that constitute separate physical and/or logical units. In addition, the memory while being communicatively connected to the processor 1004, may reside fully or partially outside of the apparatus 1000. It is also to be understood that one or more components, such as the base station 102, 210 or 706 and the UE 116, 250 or 701 can exist within a memory such as memory 1002.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 1000 of FIG. 10 can be employed as a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment. In the alternative, the processor and the storage medium may reside as discrete components in a user equipment. Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:
1. A method of wireless communication, comprising:
   determining a first number of ACK/NACK bits for acknowledging downlink data transmissions on a first configuration of a plurality of component carriers (CCs) configured for a multi-carrier user equipment (UE);
   selecting a first mapping of ACK/NACK bits to uplink control channel resources based on the first number of ACK/NACK bits, the first mapping comprising a fallback configuration for downlink data transmissions on a single component carrier, the fallback configuration being used at least in response to a base station reconfiguring the first configuration of the plurality of CCs, wherein the fallback configuration matches a single component carrier configuration for downlink data transmissions in a second mapping of ACK/NACK bits to uplink control channel resources;
   determining uplink control channel resources for acknowledging the downlink data transmissions on the first configuration of CCs based on the first mapping;
   sending ACK/NACK information for the downlink data transmissions, on uplink control channel resources based on the first mapping;
   receiving a higher-layer command to change the first configuration of component carriers; and
   determining, in response to receiving the higher-layer command, uplink control channel resources for acknowledging downlink data transmissions based on the fallback configuration of the first mapping.
2. The method of claim 1,
   from wherein the higher-layer command changes the first configuration of component carriers to a second configuration of component carriers; and
   further comprising receiving downlink data transmissions on only a single component carrier for a period after the receipt of the higher-layer command.
3. The method of claim 2, further comprising:
   sending ACK/NACK information, for the downlink data transmissions on the single component carrier, on uplink control channel resources based on the fallback configuration of the first mapping.
4. The method of claim 2, further comprising:
   determining a second number of ACK/NACK bits for acknowledging downlink data transmissions on the second configuration of component carriers (CCs);
   selecting a third mapping of ACK/NACK bits to uplink control channel resources based on the second number of ACK/NACK bits;
   sending ACK/NACK information, for the downlink data transmissions on the single component carrier, on uplink control channel resources based on a fallback configuration of the third mapping.

5. The method of claim 1,
wherein the higher-layer command changes an activation status of at least one carrier in the first configuration of CCs; and
further comprising receiving downlink data transmissions on only a single component carrier for a period after the receipt of the higher layer command.

6. The method of claim 5, further comprising:
sending ACK/NACK information for the downlink data transmissions on the single component carrier, on uplink control channel resources, based on the fallback configuration of the first mapping.

7. The method of claim 5, further comprising:
determining a second number of ACK/NACK bits for acknowledging downlink data transmissions on a plurality of activated component carriers;
selecting a third mapping of ACK/NACK bits to uplink control channel resources based on the second number of ACK/NACK bits;
sending ACK/NACK information, for the downlink data transmissions on the single component carrier, on uplink control channel resources based on a fallback configuration of the third mapping;
determining uplink control channel resources for acknowledging the downlink data transmissions on the plurality of activated CCs based on the third mapping; and
sending ACK/NACK information for the downlink data transmissions on the plurality of activated CCs on the uplink control channel resources based on the third mapping.

8. The method of claim 1,
wherein the higher-layer command changes a transmission mode of at least one carrier in the first configuration of CCs; and
further comprising receiving downlink data transmissions on only a single component carrier for a period after the receipt of the higher-layer command.

9. The method of claim 8, further comprising:
sending ACK/NACK information for the downlink data transmissions on the single component carrier, on uplink control channel resources, based on the fallback configuration of the first mapping.

10. The method of claim 8, further comprising:
determining a second number of ACK/NACK bits for acknowledging downlink data transmissions on a plurality of the configured CCs, including the at least one carrier in a second transmission mode;
selecting a third mapping of ACK/NACK bits to uplink control channel resources based on the second number of ACK/NACK bits;
sending ACK/NACK information, for the downlink data transmissions on the single component carrier, on uplink control channel resources based on a fallback configuration of the third mapping;
determining uplink control channel resources for acknowledging the downlink data transmission on the plurality of configured CCs based on the third mapping; and
sending ACK/NACK information for the downlink data transmissions on the uplink control channel resources based on the third mapping.

11. The method of claim 1, wherein the first number of ACK/NACK bits corresponds to a number of configured codewords on the plurality of component carriers and a detected DTX status of the plurality of component carriers in a subframe.

12. The method of claim 11, wherein the ACK/NACK information is represented by two bits of information mapped to a number of uplink control channel resources corresponding to the number of configured codewords and the detected DTX status in the subframe.

13. The method of claim 1, wherein the plurality of component carriers numbers N component carriers and wherein the number of ACK/NACK bits is greater than or equal to N and less than or equal to 2N.

14. The method of claim 4, further comprising:
determining uplink control channel resources for acknowledging the downlink data transmissions on the second configuration of component carriers based on the third mapping; and
sending ACK/NACK information for the downlink data transmissions on the uplink control channel resources based on the third mapping.

15. The method of claim 1, wherein the UE is configured for an uplink control channel format with channel selection, the method further comprising selecting the first mapping of uplink control channel resources based on the uplink control channel format.

16. A method in a base station, comprising:
receiving, at the base station, ACK/NACK information from a user equipment (UE) on uplink control channel resources, acknowledging downlink data transmissions;
determining ACK/NACK bits from the ACK/NACK information based on a first mapping of uplink control channel resources corresponding to a first configuration of the UE, the first mapping comprising a fallback configuration for downlink data transmissions on a single component carrier, the fallback configuration being used at least in response to the base station reconfiguring the first configuration of the UE, wherein the fallback configuration matches a configuration for downlink data transmissions on the single component carrier in a second mapping of uplink control channel resources to ACK/NACK bits;
transmitting a higher-layer command for a second configuration of downlink component carriers;
scheduling downlink data transmission to the UE on only a single component carrier for a predetermined period after transmission of the higher-layer command; and
receiving ACK/NACK bits on uplink control channel resources corresponding to the fallback configuration during the predetermined period.

17. The method of claim 16, wherein the higher-layer command is one of a reconfiguration command, an activation command, a deactivation command and a command to change transmission mode.

18. The method of claim 16, further comprising:
transmitting downlink data on the second configuration of component carriers; and
receiving ACK/NACK bits on uplink control channel resources corresponding to the second mapping after the predetermined period.

19. An apparatus, comprising:
a processor; and
a memory comprising processor executable instructions that, when executed by the processor, configures the apparatus as a multi-carrier user equipment (UE) to:
determine a first number of ACK/NACK bits for acknowledging downlink data transmissions on a first configuration of a plurality of component carriers (CCs) configured for the multi-carrier UE;
select a first mapping of ACK/NACK bits to uplink control channel resources based on the first number of ACK/NACK bits, the first mapping comprising a fallback configuration for downlink data transmissions on a single component carrier, the fallback configuration being used at least in response to a base station reconfiguring the first configuration of the plurality of CCs, wherein the fallback configuration matches a single component carrier configuration for downlink data transmissions in a second mapping of ACK/NACK bits to uplink control channel resources;

determine uplink control channel resources for acknowledging the downlink data transmissions on the first configuration of CCs based on the first mapping;

send ACK/NACK information for the downlink data transmissions, on uplink control channel resources based on the first mapping;

receive a higher-layer command to change the first configuration of component carriers; and determine, in response to receiving the higher-layer command, uplink control channel resources for acknowledging downlink data transmissions based on the fallback configuration of the first mapping.

20. The apparatus of claim 19, wherein the higher-layer command changes the first configuration of component carriers to a second configuration of component carriers; and wherein the apparatus is further configured to receive downlink data transmissions on only a single component carrier for a predetermined period after the receipt of the higher-layer command.

21. The apparatus of claim 20, wherein the apparatus is further configured to:

send ACK/NACK information, for the downlink data transmissions on the single component carrier, on uplink control channel resources based on the fallback configuration of the first mapping.

22. The apparatus of claim 20, wherein the apparatus is further configured to:

determine a second number of ACK/NACK bits for acknowledging downlink data transmissions on the second configuration of component carriers (CCs);

select a third mapping of ACK/NACK bits to uplink control channel resources based on the second number of ACK/NACK bits;

send ACK/NACK information, for the downlink data transmissions on the single component carrier, on uplink control channel resources based on a fallback configuration of the third mapping;

determine uplink control channel resources for acknowledging the downlink data transmissions on the second configuration of component carriers based on the third mapping; and send ACK/NACK information for the downlink data transmissions on the uplink control channel resources based on the third mapping.

23. The apparatus of claim 19, wherein the higher-layer command changes an activation status of at least one carrier in the first configuration of CCs; and wherein the apparatus is further configured to receive downlink data transmissions on only a single component carrier for a period after the receipt of the higher layer command.

24. The apparatus of claim 23, wherein the apparatus is further configured to:

send ACK/NACK information for the downlink data transmissions on the single component carrier, on uplink control channel resources, based on the fallback configuration of the first mapping.

25. The apparatus of claim 23, wherein the apparatus is further configured to:

determine a second number of ACK/NACK bits for acknowledging downlink data transmissions on a plurality of activated component carriers;

select a third mapping of ACK/NACK bits to uplink control channel resources based on the second number of ACK/NACK bits;

send ACK/NACK information, for the downlink data transmissions on the single component carrier, on uplink control channel resources based on a fallback configuration of the third mapping;

determine uplink control channel resources for acknowledging the downlink data transmissions on the plurality of activated CCs based on the third mapping; and send ACK/NACK information for the downlink data transmissions on the uplink control channel resources based on the third mapping.

26. The apparatus of claim 19, wherein the higher-layer command changes a transmission mode of at least one carrier in the first configuration of CCs; and wherein the apparatus is further configured to receive downlink data transmissions on only a single component carrier for a predetermined period after the receipt of the higher-layer command.

27. The apparatus of claim 26, wherein the apparatus is further configured to:

send ACK/NACK information for the downlink data transmissions on the single component carrier, on uplink control channel resources, based on the fallback configuration of the first mapping.

28. The apparatus of claim 26, wherein the apparatus is further configured to:

determine a second number of ACK/NACK bits for acknowledging downlink data transmissions on a plurality of the configured CCs, including the at least one carrier in a second transmission mode;

select a third mapping of ACK/NACK bits to uplink control channel resources based on the second number of ACK/NACK bits;

send ACK/NACK information, for the downlink data transmissions on the single component carrier, on uplink control channel resources based on a fallback configuration of the third mapping;

determine uplink control channel resources for acknowledging the downlink data transmission on the plurality of configured CCs based on the third mapping; and send ACK/NACK information for the downlink data transmissions on the uplink control channel resources based on the third mapping.

29. An apparatus, comprising:

a processor; and a memory comprising processor executable instructions that, when executed by the processor, configures the apparatus as a base station to:

receive, at the base station, ACK/NACK information from a user equipment (UE) on uplink control channel resources, acknowledging downlink data transmissions;

determine ACK/NACK bits from the ACK/NACK information based on a first mapping of uplink control channel resources corresponding to a first configuration of the UE, the first mapping comprising a fallback configuration for downlink data transmissions on a single component carrier, the fallback configuration being used at least in response to a base station reconfiguring the first configuration of the UE, wherein the fallback configuration matches a configuration for downlink data transmissions on the single component carrier in a second mapping of uplink control channel resources to ACK/NACK bits;

transmit a higher-layer command for a second configuration of downlink component carriers;

schedule downlink data transmission to the UE on only a single component carrier for a predetermined period after transmission of the higher-layer command; and receive ACK/NACK bits on uplink control channel resources corresponding to the fallback configuration during the predetermined period.

30. The apparatus of claim 29, wherein the higher-layer command is one of a reconfiguration command, an activation command, a deactivation command and a command to change transmission mode.

31. The apparatus of claim 30, wherein the apparatus is further configured to:

transmit downlink data on the second configuration of component carriers; and receive ACK/NACK bits on uplink control channel resources corresponding to the second mapping after the predetermined period.

32. A computer program product for wireless communication in a wireless network, comprising a non-transitory machine-readable medium having program code recorded thereon to the program code comprising:

program code to determine a first number of ACK/NACK bits for acknowledging downlink data transmissions on a first configuration of a plurality of component carriers (CCs) configured for the multi-carrier UE;

program code to select a first mapping of ACK/NACK bits to uplink control channel resources based on the first number of ACK/NACK bits, the first mapping comprising a fallback configuration for downlink data transmissions on a single component carrier, the fallback configuration being used at least in response to a base station reconfiguring the first configuration of the plurality of CCs, wherein the fallback configuration matches a single component carrier configuration for downlink data transmissions in a second mapping of ACK/NACK bits to uplink control channel resources;

program code to determine uplink control channel resources for acknowledging the downlink data transmissions on the first configuration of CCs based on the first mapping;

program code to send ACK/NACK information for the downlink data transmissions, on uplink control channel resources based on the first mapping;

program code to receive a higher-layer command to change the first configuration of component carriers; and program code to determine, in response to receiving the higher-layer command, uplink control channel resources for acknowledging downlink data transmissions based on the fallback configuration of the first mapping.

33. The computer program product of claim 32, wherein the higher-layer command changes the first configuration of component carriers to a second configuration of component carriers; and wherein the program code further comprises program code to receive downlink data transmissions on only a single component carrier for a predetermined period after the receipt of the higher-layer command.

34. The computer program product of claim 33, wherein the program code further comprises program code to send ACK/NACK information, for the downlink data transmissions on the single component carrier, on uplink control channel resources based on the fallback configuration of the first mapping.

35. The computer program product of claim 33, wherein the program code further comprises:

program code to determine a second number of ACK/NACK bits for acknowledging downlink data transmissions on the second configuration of component carriers (CCs);

program code to select a third mapping of ACK/NACK bits to uplink control channel resources based on the second number of ACK/NACK bits;

program code to send ACK/NACK information, for the downlink data transmissions on the single component carrier, on uplink control channel resources based on a fallback configuration of the third mapping;

program code to determine uplink control channel resources for acknowledging the downlink data transmissions on the second configuration of component carriers based on the third mapping; and program code to send ACK/NACK information for the downlink data transmissions on the uplink control channel resources based on the third mapping.

36. The computer program product of claim 32, wherein the higher-layer command changes an activation status of at least one carrier in the first configuration of CCs; and wherein the program code further comprises program code to receive downlink data transmissions on only a single component carrier for a predetermined period after the receipt of the higher layer command.

37. The computer program product of claim 36, wherein the program code further comprises program code to send ACK/NACK information for the downlink data transmissions on the single component carrier, on uplink control channel resources, based on the fallback configuration of the first mapping.

38. The computer program product of claim 36, wherein the program code further comprises:

program code to determine a second number of ACK/NACK bits for acknowledging downlink data transmissions on a plurality of activated component carriers;

program code to select a third mapping of ACK/NACK bits to uplink control channel resources based on the second number of ACK/NACK bits;

program code to send ACK/NACK information, for the downlink data transmissions on the single component carrier, on uplink control channel resources based on a fallback configuration of the third mapping;

program code to determine uplink control channel resources for acknowledging the downlink data transmissions on the plurality of activated CCs based on the second mapping; and program code to send ACK/NACK information for the downlink data transmissions on the uplink control channel resources based on the third mapping.

39. The computer program product of claim 32, wherein the higher-layer command changes a transmission mode of at least one carrier in the first configuration of CCs; and wherein the program code further comprises program code to receive downlink data transmissions on only a single component carrier for a period after the receipt of the higher-layer command.

40. The computer program product of claim 39, wherein the program code further comprises program code to send ACK/NACK information for the downlink data transmissions on the single component carrier, on uplink control channel resources, based on the fallback configuration of the first mapping.

41. The computer program product of claim 39, wherein the program code further comprises:
program code to determine a second number of ACK/NACK bits for acknowledging downlink data transmissions on a plurality of the configured CCs, including the at least one carrier in a second transmission mode;
program code to select a third mapping of ACK/NACK bits to uplink control channel resources based on the second number of ACK/NACK bits;
program code to send ACK/NACK information, for the downlink data transmissions on the single component carrier, on uplink control channel resources based on a fallback configuration of the third mapping;
program code to determine uplink control channel resources for acknowledging the downlink data transmission on the plurality of configured CCs based on the third mapping; and
program code to send ACK/NACK information for the downlink data transmissions on the uplink control channel resources based on the third mapping.

42. A apparatus for wireless communication, comprising:
means for determining a first number of ACK/NACK bits for acknowledging downlink data transmissions on a first configuration of a plurality of component carriers (CCs) configured for a multi-carrier user equipment (UE);
means for selecting a first mapping of ACK/NACK bits to uplink control channel resources based on the first number of ACK/NACK bits, the first mapping comprising a fallback configuration for downlink data transmissions on a single component carrier, the fallback configuration being used at least in response to a base station reconfiguring the first configuration of the plurality of CCs, wherein the fallback configuration matches a single component carrier configuration for downlink data transmissions in a second mapping of ACK/NACK bits to uplink control channel resources;
means for determining uplink control channel resources for acknowledging the downlink data transmissions on the first configuration of CCs based on the first mapping; and
means for sending ACK/NACK information for the downlink data transmissions, on uplink control channel resources based on the first mapping;
means for receiving a higher-layer command to change the first configuration of component carriers; and
means for determining, in response to receiving the higher-layer command, uplink control channel resources for acknowledging downlink data transmissions based on the fallback configuration of the first mapping.

43. The apparatus of claim 42, wherein the higher-layer command changes the first configuration of component carriers to a second configuration of component carriers; and
further comprising means for receiving downlink data transmissions on only a single component carrier for a predetermined period after the receipt of the higher-layer command.

44. The apparatus of claim 43, further comprising:
means for sending ACK/NACK information, for the downlink data transmissions on the single component carrier, on uplink control channel resources based on the fallback configuration of the first mapping.

45. The apparatus of claim 43, further comprising:
means for determining a second number of ACK/NACK bits for acknowledging downlink data transmissions on the second configuration of component carriers (CCs);
means for selecting a third mapping of ACK/NACK bits to uplink control channel resources based on the second number of ACK/NACK bits;
means for sending ACK/NACK information, for the downlink data transmissions on the single component carrier, on uplink control channel resources based on a fallback configuration of the third mapping;
means for determining uplink control channel resources for acknowledging the downlink data transmissions on the second configuration of component carriers based on the third mapping; and
means for sending ACK/NACK information for the downlink data transmissions on the uplink control channel resources based on the third mapping.

46. The apparatus of claim 42, wherein the higher-layer command changes an activation status of at least one carrier in the first configuration of CCs; and
further comprising means for receiving downlink data transmissions on only a single component carrier for a predetermined period after the receipt of the higher layer command.

47. The apparatus of claim 46, further comprising:
means for sending ACK/NACK information for the downlink data transmissions on the single component carrier, on uplink control channel resources, based on the fallback configuration of the first mapping.

48. The apparatus of claim 46, further comprising:
means for determining a second number of ACK/NACK bits for acknowledging downlink data transmissions on a plurality of activated component carriers;
means for selecting a third mapping of ACK/NACK bits to uplink control channel resources based on the second number of ACK/NACK bits;
means for sending ACK/NACK information, for the downlink data transmissions on the single component carrier, on uplink control channel resources based on a fallback configuration of the third mapping;
means for determining uplink control channel resources for acknowledging the downlink data transmissions on the plurality of activated CCs based on the third mapping; and
means for sending ACK/NACK information for the downlink data transmissions on the uplink control channel resources based on the third mapping.

49. The apparatus of claim 42, wherein the higher-layer command changes a transmission mode of at least one carrier in the first configuration of CCs; and
further comprising means for receiving downlink data transmissions on only a single component carrier for a predetermined period after the receipt of the higher-layer command.

50. The apparatus of claim 49, further comprising:
means for sending ACK/NACK information for the downlink data transmissions on the single component carrier, on uplink control channel resources, based on the fallback configuration of the first mapping.

51. The apparatus of claim 49, further comprising:
means for determining a second number of ACK/NACK bits for acknowledging downlink data transmissions on a plurality of the configured CCs, including the at least one carrier in a second transmission mode;
means for selecting a third mapping of ACK/NACK bits to uplink control channel resources based on the second number of ACK/NACK bits;
means for sending ACK/NACK information, for the downlink data transmissions on the single component carrier, on uplink control channel resources based on a fallback configuration of the third mapping;
means for determining uplink control channel resources for acknowledging the downlink data transmission on the plurality of configured CCs based on the third mapping; and
means for sending ACK/NACK information for the downlink data transmissions on the uplink control channel resources based on the third mapping.

* * * * *